(12) United States Patent
Shannon

(10) Patent No.: US 7,080,477 B2
(45) Date of Patent: Jul. 25, 2006

(54) METHOD OF FLY FISHING AND A UNIFIED KIT FOR ON-THE-WATER FISHING FLY RETENTION, SELECTION AND INSTRUCTION

(76) Inventor: Kyle Shannon, 218 Elmwood Rd., South Salem, NY (US) 10590

( * ) Notice: Subject to any disclaimer, the term of this patent is extended or adjusted under 35 U.S.C. 154(b) by 0 days.

(21) Appl. No.: 10/838,744

(22) Filed: May 5, 2004

(65) Prior Publication Data
US 2005/0044774 A1    Mar. 3, 2005

Related U.S. Application Data

(60) Provisional application No. 60/498,233, filed on Aug. 28, 2003.

(51) Int. Cl.
*A01K 97/06* (2006.01)
(52) U.S. Cl. .............................. 43/54.1; 43/57.1; 43/4.5
(58) Field of Classification Search ...................... None
See application file for complete search history.

(56) References Cited

U.S. PATENT DOCUMENTS 6,516,555 B1 *  2/2003  Buzzell ........................ 43/57.1

FOREIGN PATENT DOCUMENTS

FR           2 551 320      *  9/1983

OTHER PUBLICATIONS

Doc Sneed, Fly Fishing Guides from Doc Sneed, Inc., archived on Aug. 11, 2002 on the Wayback Machine website as indicated at the top of each page.*

(Continued)

*Primary Examiner*—Michael J. Carone
*Assistant Examiner*—Bret Hayes
(74) *Attorney, Agent, or Firm*—Melvin I. Stoltz

(57) ABSTRACT

A kit for selecting and using artificial fishing flies includes a container with compartments for holding a preselected assortment of fishing flies and instruction sets related to the compartment instructing an angler which flies to select and when, where and/or how to fish those flies depending upon the physical characteristics and conditions of a fishing location. A method of fly fishing includes the steps of directing an angler's observation of the then existing physical characteristics and conditions of the fishing location; matching those characteristics and conditions with instructions from a kit to select a particular fly from the kit; and directing the angler when, where and how to fish the selected fly. A method of marketing fishing flies includes the steps of creating a kit by selecting and packaging a collection of flies tailored to a particular fishing location; providing instructions for the kit to correspond to the flies of the collection and directing an angler which particular fly to select from the collection based on particular conditions encountered at the fishing location; and selling the kit independent of instruction by a local fly shop or instructional resource.

9 Claims, 3 Drawing Sheets

OTHER PUBLICATIONS

*The Hatches Made Simple* by Charles R. Meck, First Ed., The Countryman Press, Woodstock, Vermont, 2002, pp. 7, 9-10, 24, 82-88. Hatch charts for selected rivers and times of year.

*Hatches II* by Caucci, et al., The Lyons Press, NY, NY, 1986, pp. 29-33, 322-325. Describing different stages of mayfly development, compromise fly pattern charts.

*Mayflies "Top to Bottom"* by Shane Stalcup, Frank Amato Publications, Inc., Portland, Or., 2002. Generally, pp. 36-156. Photographs regarding imitation of mayfly variations and exact duplication.

Orvis Fly Fishing Catalog, Spring 2003, pp. 60-73. Fly boxes, fly selections, books.

L.L. Bean Fly Fishing 2004 Catalog, pp. 26-37. Fly boxes, fly selections, books.

Cabela's Fly-Fishing Catalog, Spring/Summer 2004, pp. 74-87. Fly boxes, fly selections, books.

www.docsneed.com Selling pocket sized card with rotatable dial and information concerning insects that trout eat.

www.flyfishingreport.com Provides localized hatch charts.

* cited by examiner

METHOD OF FLY FISHING AND A UNIFIED KIT FOR ON-THE-WATER FISHING FLY RETENTION, SELECTION AND INSTRUCTION This application claims the benefit of prov. Pat. No. 60/498233 filed on Aug. 28, 2003.

FIELD OF THE INVENTION

The invention relates to a method of fly fishing featuring a unified system or kit for removably retaining fishing flies in an organized manner keyed to instructions to an angler, while fishing, regarding which of the retained flies to select and how best to fish a selected fly.

BACKGROUND OF THE INVENTION

To the novice, fly fishing to catch fish, particularly trout which feed on insects such as mayflies having numerous life cycle stages, can be a frustrating, and even an exasperating experience. Fly fishing for other fish in fresh or salt water presents similar problems in fly selection depending upon the physical characteristics of the water body including, habitat, structure or water conditions such as tide and fishing location. To the experienced fly fisherman, fly fishing is not only an art, but also a science which has basis in being able to recognize the target fishes' potential forage or prey sources, or as used in the art, to "match the hatch" and, more particularly, in trout fishing to have knowledge of changes in the hatch and its concomitant match which can occur within the hours of a morning to evening fishing expedition as different insect life cycle stages progress.

Fly fishermen previously used to "match the hatch" while trout fishing by generic tabular or graphic representation of the time of year when a particular insect hatches and of its color, such as is well illustrated in *The Hatches Made Simple* by Charles R. Meck, First Ed., The Countryman Press, Woodstock, Vt., 2002. So, too, in addition to localized hatch charts which have long been available to fly fishermen in printed form (and now on the Web; see, e.g., www.flyfishingreport.com), an excellent publication which illustrates the geographic diversity of insects that trout feed on is found in Caucci, et al., *Hatches II*, The Lyons Press, NY, N.Y., 1986. Similar publications, including periodicals, focus on the same diversity of forage problem, though generally a bit less complex, in fishing for other species, including saltwater species such as striped bass.

As set forth in the introduction to *The Hatches Made Simple*, Mr. Meck states that "Predicting when a hatch will occur is always a problem. If you're fishing in the morning in summer, what hatch can you expect to see? What about a summer evening—what can you expect to see at that time? How about a fall afternoon?" (P. 7). The same principles apply generally to fly selection variables in other forms of fly fishing where an angler may be targeting several different species of fish, where there are numerous potential types of forage or prey species, or where the angler may be fishing several different locations in the same day or trip. At bottom, trout and other predatory fish eat whatever is available in their locale at any particular time of the day or year. In that regard, illustrative aids for trout anglers to employ to "match the hatch," for insects other than in book form, are fly fishing guides from Doc Sneed (www.docsneed.com; Jun. 2003), these aids comprising a pocket-sized card with a rotatable dial and illustrations and written information concerning what insects trout eat.

As succinctly disclosed at www.flyfishing-flies.com, and acknowledged in general, insects that trout eat pass through five states—egg, nymph, dun, spinner and spent. Significantly, a mayfly may mature from a larval stage and mature (egg to nymph to dun), reproduce (spinner) and die (spent) within one to three days and even in less than an entire day. Thus, if the fly fishing angler is not on target with the particular insect population in the area and its hatch and nymph to dun metamorphosis, that angler may spend a lot of time in or on the water and end up empty-handed (see Meck at p. 10). As disclosed by Meck at page 24, a mayfly is at the most vulnerable part of its lifecycle when it emerges from the larval stage as a nymph and rises to the surface of the water to begin its short-lived fly existence out of the water. As described by Caucci, et al, at page 31, "During its preoccupation with emergence, the nymph or dun reaches its peak of vulnerability. In the water, they are subjected to relentless attack by the trout. Anglers should note that, during that time, the trout become extremely selective to the physical size, color and shape of the particular species emerging and their emergence characteristics and that one must duplicate this activity if successful angling is to be experienced."

For years, the experienced fly fishing angler has designed imitations of live insects to achieve a successful day of fly fishing, and illustrative of how to do so is found in *Mayflies "Top to Bottom"* by Shane Stalcup, Frank Amato Publications, Inc., Portland, Oreg., 2002. Successful imitation of available forage or prey, regardless of the target fish or locale always dictates the angler's success. However, information set forth at www.flyfishing-flies.com (Jun. 2003) notes that "[T]here are thousands, of fly patterns . . . [which have been constructed] . . . to imitate these insects at the difference states of their development . . . [and] a lot of folklore and fishing jargon surrounding these flies . . . [and that] . . . the best advice when you first start fly fishing is to ignore it all . . . [and just] . . . keep a range of imitations in your fly box to cover the life cycle of these insects from aquatic nymph to the spent dead mayfly floating on the water surface." Accordingly, flies and fly system collections that are conventionally used and commercially available follow that simplicity and are imitations of individual insects and sets of the members of the standard nymph, dun, spinner and spent stages, or of other common forage or prey species. Illustrative of what is available commercially may be seen, for example, at the above-noted www.flyfishing-flies.com (Jun. 2003) site or through commercial catalogues for outdoor outfitters such as L. L. Bean, Orvis or Cabelas.

Moreover, although thousands of fly patterns may be known, and perhaps because of the sheer mass of information known and available, there is a need for simplification of on-the-water fly selection for certain conditions and instruction of proven methods of fishing the selected fly to enable a novice, intermediate, or even an experienced fly fisher to have a successful day. Even an experienced and well versed fly fisherman is incapable of retaining all of the various flies and methods of the numerous types of fly fishing in his mind, making even the expert in some unfamiliar location a novice. For the novice or visiting angler, specific flies and the cues to use them in conjunction with the methods to use them are a mystery, often leading to frustrating fishless days and ultimately abandonment of the location as a destination or, even worse, of the sport altogether.

Although preselected collections of removably retained fishing flies are known and marketed widely, they fail to include the most valuable and difficult information to obtain and retain, specifically oriented to the individual flies they contain; they do not include the locations and methods in which to fish them. For convenience and inventory tracking, loose flies in fly shops typically are organized by patterns in contrast to species. In addition, the sale of locally successful flies typically requires sophisticated sales advice including instruction on where to fish, and which fly to use under which conditions. Unfortunately, local fly shops' oral advice and various method instructions are almost never written, are forgotten, lost, hurried, vague or not understood and ultimately always have little value on the water. Furthermore, such sophisticated advice in conjunction with the fly itself is only available off the water, in the store, often physically located miles, hours or even days from a particular fishing location. This advice must be obtained during business hours, when the right salesman is available and not off fishing himself. The same can be said of books that include hatch charts or precise suggestions for specific flies which are not related to the physical tangible fly itself. This disjunction between the physical fly or fly selection on the water and the knowledge of how and where to fish it present a constant problem to even the most experienced angler.

A related problem presents itself not only to the angler, but also to the seller of flies. Because of the physical distance between fly shops and fishing locations and the hours a fly shop or fly seller are open, in conjunction with the early and late hours that are often best for fishing, many sales are often lost because the fly shop was not open or was located too far from the fishing location.

Now, it has been found, based upon empirical experience, that improvement for the novice, intermediate, and even the traveling or visiting expert, can be achieved by reason of the present invention described below. It also has been found, based upon empirical evidence, that improvement to remote sales of flies, independent of store hours or the provision of sophisticated advice, can be achieved by reason of the invention described below.

OBJECTS OF THE INVENTION

Accordingly, an object of this invention is to provide a new and improved method of fly fishing through the use of a system for on-the-water fly retention, selection and instruction that simplifies an angler's on-the-water retention and selection of flies. Included in this object is the aim of providing interactive instruction related to the retained flies for selecting a specific fly best matching a particular stage of an insect's life cycle, or other particular prey, and how and where within a body of water to fish that fly to mimic that stage of that insect or fish prey to maximize the angler's chances of catching a fish at any given time during a day of fishing.

Another object of this invention is to provide such a new and improved method for fly retention, selection and instruction that maximizes a novice or visiting angler's chances of successfully understanding and mimicking the prey species and accordingly catching fish.

A further object of this invention is to provide a new and improved method for marketing flies that lends itself functionally to selling flies to anglers of all skill levels, independent of sophisticated advice or restricted hours of sale.

Yet another object of this invention is to provide a new and improved fishing kit featuring a preselected fly grouping and retaining unit for maintaining the grouping in an organized fashion, even under active fishing conditions, with instructions keyed to the grouping for selecting and matching a given fly from the grouping to actual fishing conditions.

Other objects will be in part obvious and in part pointed out more in detail hereinafter.

SUMMARY OF THE INVENTION

The present invention relates to a method for fly fishing and more particularly to a method and system or kit for selecting and using artificial flies from a preselected collection of artificial flies according to specific instructions accompanying that collection directed to each individual fly. This invention also concerns a novel method of marketing flies to both novice anglers and experienced anglers, including those visiting an unfamiliar locale.

To achieve the objects of this invention, an innovative method of fly fishing is disclosed that teaches observation of physical characteristics of a fishing location, reference to an instructional aspect of an interactive kit for on-the-water fly retention, selection and instruction that relates to specific preselected flies removably retained by the system, selection of a specific fly identified by the instructions to correspond to the observed characteristics, and fishing the selected fly according to the instructions.

An interactive kit is disclosed as providing instructions for selecting a fishing fly from a preselected grouping of fishing flies based upon the observation of physical characteristics of a particular fishing location, with the instructions integrated into a retaining unit for removably retaining fishing flies. The instructions are keyed with each of the retained flies and methods of fishing the selected fly based on the observed conditions.

A better understanding of the objects, advantages, features, properties and relations of the invention will be obtained from the following detailed description and accompanying drawings which set forth certain illustrative embodiments and are indicative of the various ways in which the principles of the invention are employed.

DESCRIPTION OF PREFERRED EMBODIMENTS

Preferred embodiments of a system or kit (generally designated at 10) of this invention are disclosed for use in retaining fishing flies in a manner organized in relation to instructions as to which fly to select for use at a given time of day and of the year depending upon varying conditions encountered or observed while fishing and how to fish the selected fly most effectively in those particular conditions. The fishing fly component of the kit may be any type or grouping of fishing flies (several of which are illustrated by way of example in FIG. 1) preselected to correspond to any of several nonexclusive considerations including but not limited to geographic location, time of year, one or more target fish species, particular species or groupings of insects or other fish prey and type of water body.

By way of background, the instruction/retaining means component of the kit contains both a unit for removably retaining the flies and instructions preferably integrated with that retaining unit, although they may be separable. The retaining unit may be any one of several currently available methods of removably retaining fishing flies including but not limited to, compartments of a fly box; foam, nub, pinch, magnetic or fleece retaining pads; threaders or fleece fly folders; leader stretchers, drying patches or the like, all commonly known in the art. The instructions may be graphic, textual, or audio and are preferably physically integrated with the retaining unit in such a way that they are easily understood and relate interactively, for example, spacially and graphically, to the fly or flies that they identify and correspond to. Instructions are identified for individual types of fly, for example, such as each individual life cycle stage. Such instructions describe what on-the-water conditions and observations should lead an angler to choose each individual fly and further describe methods of how to fish that particular fly once selected.

Figure 1:
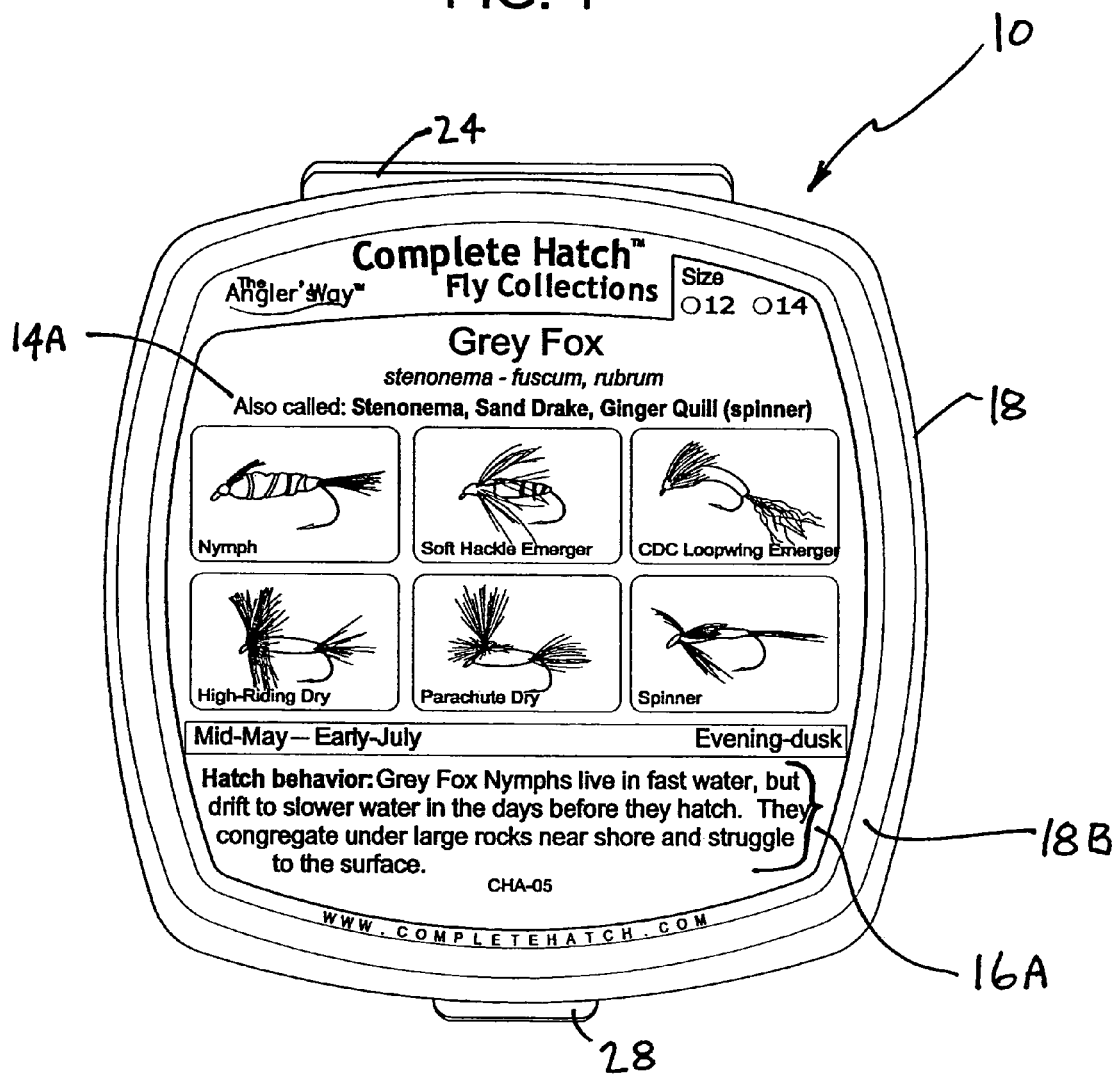
FIG. 1 is a plan view of an outer face of a cover of a kit incorporating this invention.
Figure 2:
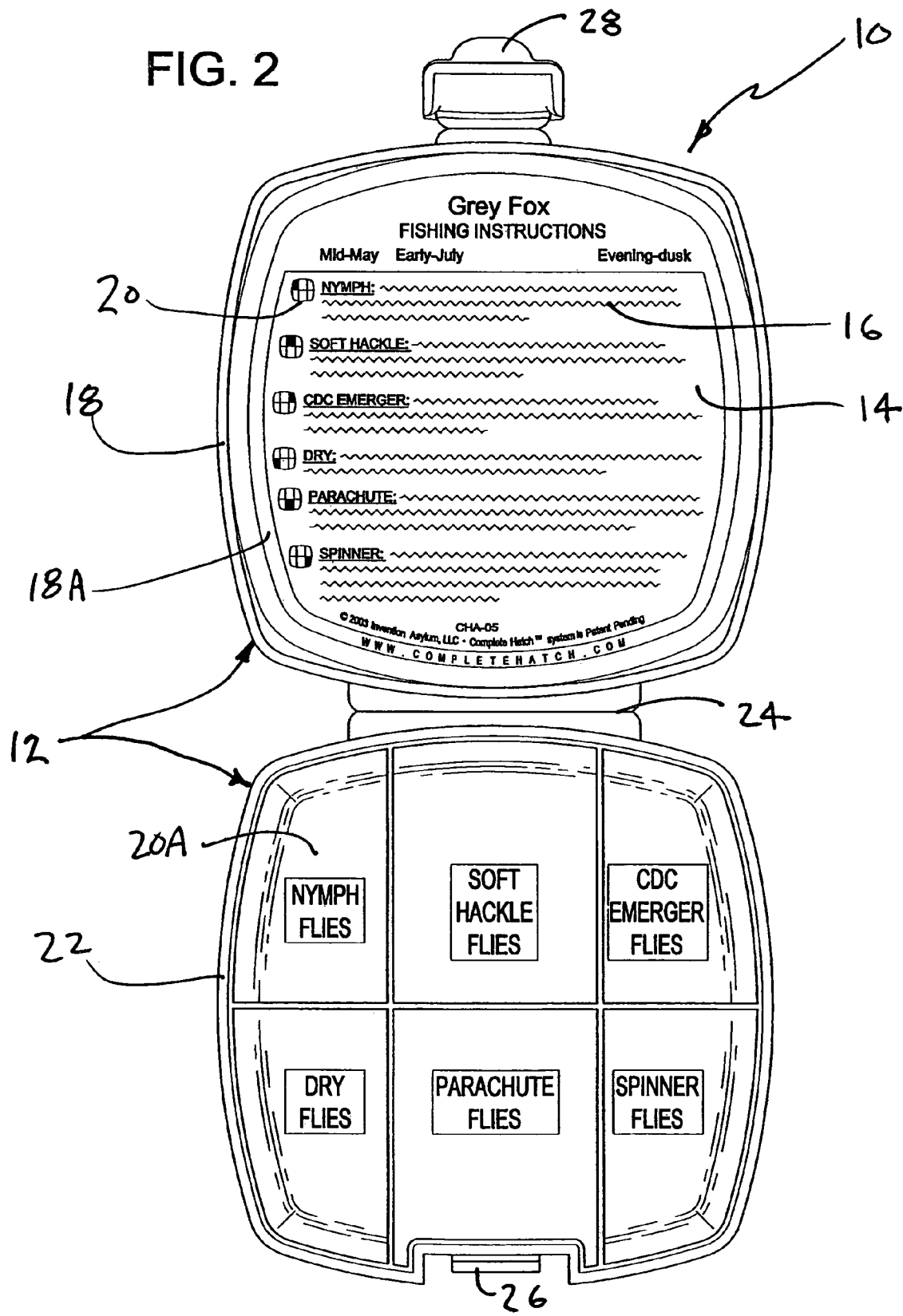
FIG. 2 is a plan view of the kit of FIG. 1 in an open, unlatched condition showing an inner face of its cover hinged to a base of the kit.

To integrate fly retaining unit or container 12 with the instructions critical to successful fly fishing in accordance with this invention, the embodiment of the invention illustrated in FIGS. 1 and 2 provides an adhesive label 14 (FIG. 2) setting forth detailed instructions represented by printed matter at 16, attached to an inside face 18A of cover 18 of container 12. These instructions 16 identify selection and fishing techniques for each respective fly and are organized, for example, by symbols such as at 20 to graphically relate to a given compartment such as at 20A within a base 22 of container 12 that contains a fly (not shown) corresponding to the instructions 16 identifying that fly selection and fishing technique.

For example, in FIG. 2 the kit 10 pertains to specific instructions 16 and a retaining unit provided by a compartmentalized base 22 of kit 10 directed to fishing flies for trout representing successive life cycle stages of a single species of mayfly and a color scheme meant to mimic that species of mayfly as it progresses through its successive life cycle stages with each life cycle stage fly assigned a particular compartment within container 12. In this illustrated embodiment, the base 22 and cover 18 are hinged at 24 for quick and easy opening and closing of kit 10 and may be releasably secured by any suitable latch members such as at 26, 28. Instructions 16 further describe what physical conditions observed at the fishing location call for selection of each particular fly and also include methods or techniques for fishing each individual fly depending on the observed conditions, all effecting a physical and intellectual interaction among the three elements of the kit by the angler in selecting a given fly.

In contrast, general instructions 16A may be set forth on a label 14A fixed to an outer face 18B of kit cover 18 (FIG. 1) for identifying and using a Grey Fox grouping of flies. As illustrated, those general instructions 16A state "Grey Fox Nymphs live in fast water, but drift to slower water in the days before they hatch. They congregate under large rocks near shore and struggle to the surface". As noted above, more specific instructions 16 for fishing the Grey Fox nymph fly are provided on label 14 on inner face 18A of kit cover 18 and graphically indicate by symbol 20 in the illustrated embodiment the specific corresponding compartment 20A in kit base 22 in which nymph flies, for example, are located. Those specific instructions 16A may state "NYMPH: Fish the nymph deep near the shore of rocky runs. Bounce the nymph off the bottom and twitch up to the surface to trigger strikes."

Figure 3:
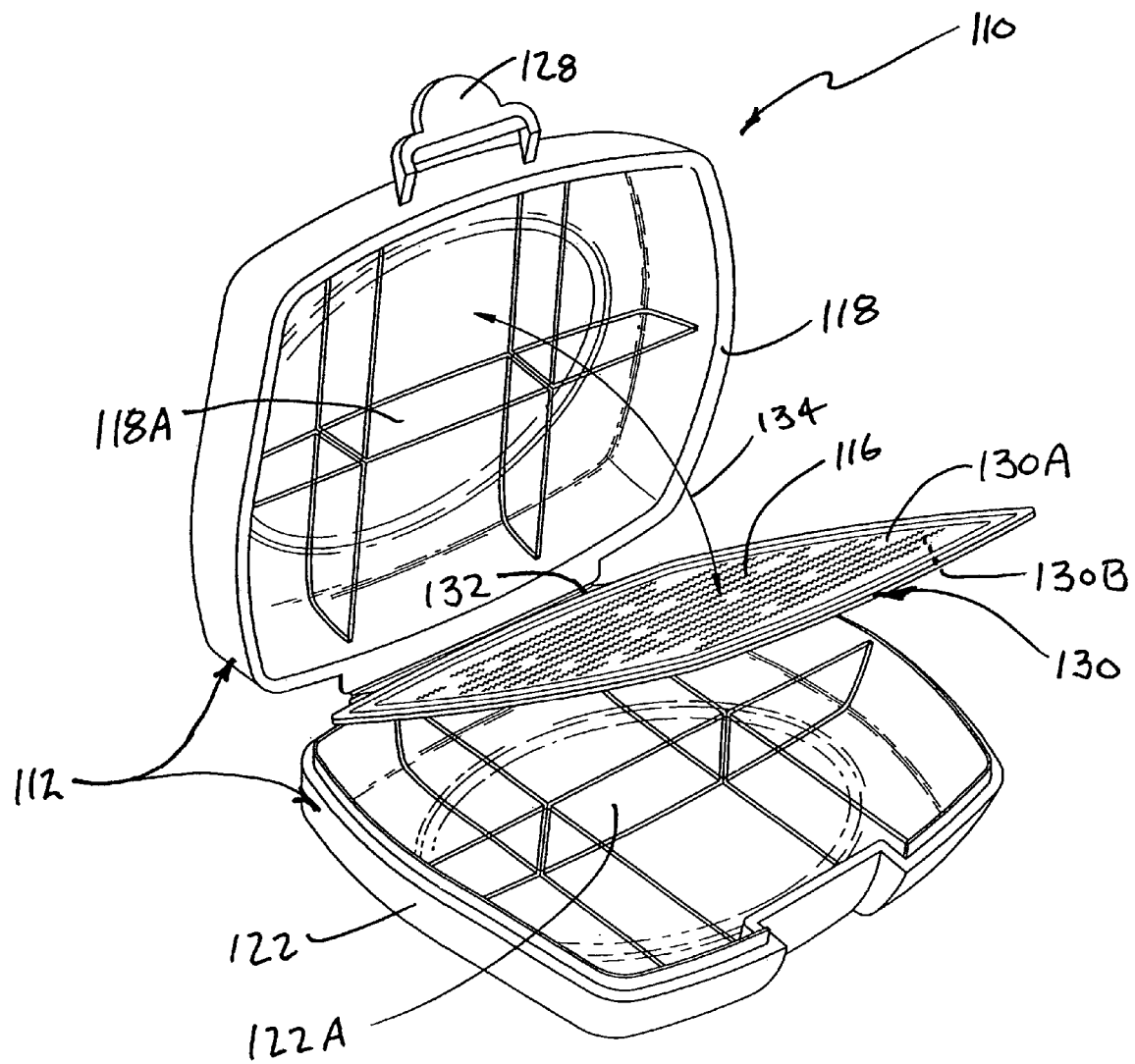
FIG. 3 is a perspective view showing another embodiment of a kit incorporating this invention.

In another embodiment of the invention shown in FIG. 3, instructions are integrated into retaining unit or container 112 by means of an instruction card 130 secured as an integral pivoting member along a hinged joint 132 and disposed between cover 118 of kit 110 and its base 122 for movement along an angular path depicted by arrow 134. This second embodiment is particularly suited to hold two different groupings of flies (not shown). Kit 110 features two multi-compartment retaining units 118A and 122A separated by instruction card 130. Fly retention may be further enhanced by the provision of foam-lined or nub-lined box compartments or combination of foam and compartments. It is to be understood that appropriate instructions appear as printed matter such as at 116 on opposite sides 130A and 130B of card 130 keyed, respectively, to confronting adjacent compartments of units 118A and 122A to identify not only the physical location of the corresponding flies in retaining units 118A and 122A but also provide fishing instructions for those individual flies. By virtue of the above described construction, kit 110 uniquely organizes a preselected grouping of flies within a suitable retaining unit and instructions are integrated with the retaining unit keyed to the grouping of flies. Other embodiments contemplated will include, but are not limited to, similar systems appropriate to other selections of flies for other species of mayflies, caddis flies, and terrestrials, bass flies, and regional or target-species specific selections for saltwater.

It will be appreciated that this invention is geared toward education of the beginning or visiting experienced angler while at a given actual fishing location. The kit and methods of this invention further facilitate a specialized albeit simplified approach for successful fly fishing both at novice and experienced skill levels in remote locales using preselected fishing flies coupled with fly retaining means and instructions in a unified system oriented toward matching actual fishing conditions. More specifically, a method of fly fishing in accordance with this invention contemplates (1) observing the geographical location, time of year and intended target fish species expectations for a planned fishing trip and also (2) grouping preselected fishing flies in an array, within suitable retaining means, based upon such location, time and target species expectations. Instructions are provided and keyed in an organized relation to the array of the grouping. Actual physical conditions are observed including target fish behavior, current air and water temperature, tide if applicable, forage prey behavior and activity. Observed actual physical conditions then are matched to the corresponding set of instructions. More specifically, this inventive method includes identifying and selecting one of the flies of the array identified in a corresponding matched set of instructions; fishing the selected fly according to the chosen fly's instructions and changing flies or techniques according to instructions as observations of actual conditions dictate.

This invention further includes a method of marketing fishing flies. This method (1) identifies popular fishing destinations based upon factors such as times of year, geographic locations and target species for novice or visiting fly fisherman and (2) groups preselected fishing flies based upon historical knowledge and information regarding factors such as past success of those flies in a geographical location, time of year, and target fish species. Instructions then are recorded and keyed to the different flies based upon historical knowledge and information as to successful methods of fishing each of these flies and the conditions under which each fly is most likely to be successful. Further steps involve integrating the recorded instructions with a retaining unit for the flies with the recorded instructions keyed to each corresponding fly and its location within the retaining unit. Thereafter, the method provides for selling the recorded instructions in combination with the corresponding flies and retaining unit. Such sales can be direct, or by means of a dispensing machine and even can be remote, say, from a fly shop or outfitter by means of the Internet.

Although this invention has been illustrated and described with respect to exemplary embodiments thereof, it should be understood by those skilled in the art that various changes, omissions and additions may be made without departing from the spirit and scope of the invention.

I claim:

1. A unified kit of on-the-water fishing fly retention, selection, and instruction comprising:
  i. retaining means for removably retaining a preselected assortment of artificial fishing flies, said retaining means comprising a container incorporating a base and a cover, each having divided compartments for respectively retaining individual fishing flies, the divided compartments each containing a fly representing a different type of fish prey, said cover having a hinged connection to the base for pivoting movement relative to the base, wherein the divided compartments are provided in both the cover and the base of the container, and wherein an instruction card is mounted along the hinged connection of the container and serves to separate the multiple compartments of the cover of the container from the multiple compartments of the base of the container;
  ii. instruction means for directing an angler as to which individual fly to select from the assortment and how to fish the selected fly, said instruction means including an instruction card hinged to the retaining means, the card being pivotally movable relative to the retaining means for enhancing the fly retaining function of the kit.

2. The kit defined in claim 1, wherein the container includes a cover and a base having a hinged connection to the cover for pivoting movement relative to the cover wherein the divided compartments are provided in both the cover and the base of the container, and wherein the instruction card is mounted along the hinged connection of the container and serves to separate the multiple compartments of the cover of the container from the multiple compartments of the base of the container.

3. A unified kit of on-the-water fishing fly retention, selection, and instruction comprising:
  A. retaining means for removably retaining a preselected assortment of artificial fishing flies, said retaining means comprising a container incorporating a base and a cover, said base having divided compartments for respectively retaining individual fishing flies, the divided compartments each containing a fly representing a different type of fish prey, said cover having a hinged connection to the base for pivoting movement relative to the base, wherein the divided compartments are provided in the base of the container, and wherein an instruction card is mounted along the hinged connection of the container and serves to separate the cover of the container from the multiple compartments of the base of the container; and
  B. instruction means for directing an angler as to which individual fly to select from the assortment and how to fish the selected fly, said instruction means including an instruction card hinged to the retaining means, the card being pivotally movable relative to the retaining means for enhancing the fly retaining function of the kit.

4. The kit defined in claim 3, wherein the instruction means comprising indicia for identifying each of the retained flies based upon observed physical characteristics of a given fishing location, the indicia on the cover including symbols graphically relating each specific compartment of the container containing a fly to a corresponding keyed set of instructions.

5. The kit defined in claim 3, wherein said assortment of artificial fishing flies is further defined as comprising a single species, and each of the artificial fishing flies of said assortment is further defined as comprising different life stages of said single species.

6. The kit defined in claim 5, wherein the instruction means of said kit are further defined as directing an angler as to the specific conditions under which each of the artificial fishing flies representing the different life stages of said single species should be used.

7. The kit defined in claim 6, wherein said instruction means further includes information on the best way to use each of the artificial fishing flies representing the different life stages of said single species.

8. The kit defined in claim 6, wherein the instruction means is further defined as being specifically constructed for use with the single species of artificial fishing flies contained in said retaining means.

9. The kit defined in claim 6, wherein the instruction means directs the angler as to which artificial fishing fly to select based on existing physical characteristics of the fishing location.

* * * * *